INVENTOR.
Harvey A. Ewell
BY
Attorney

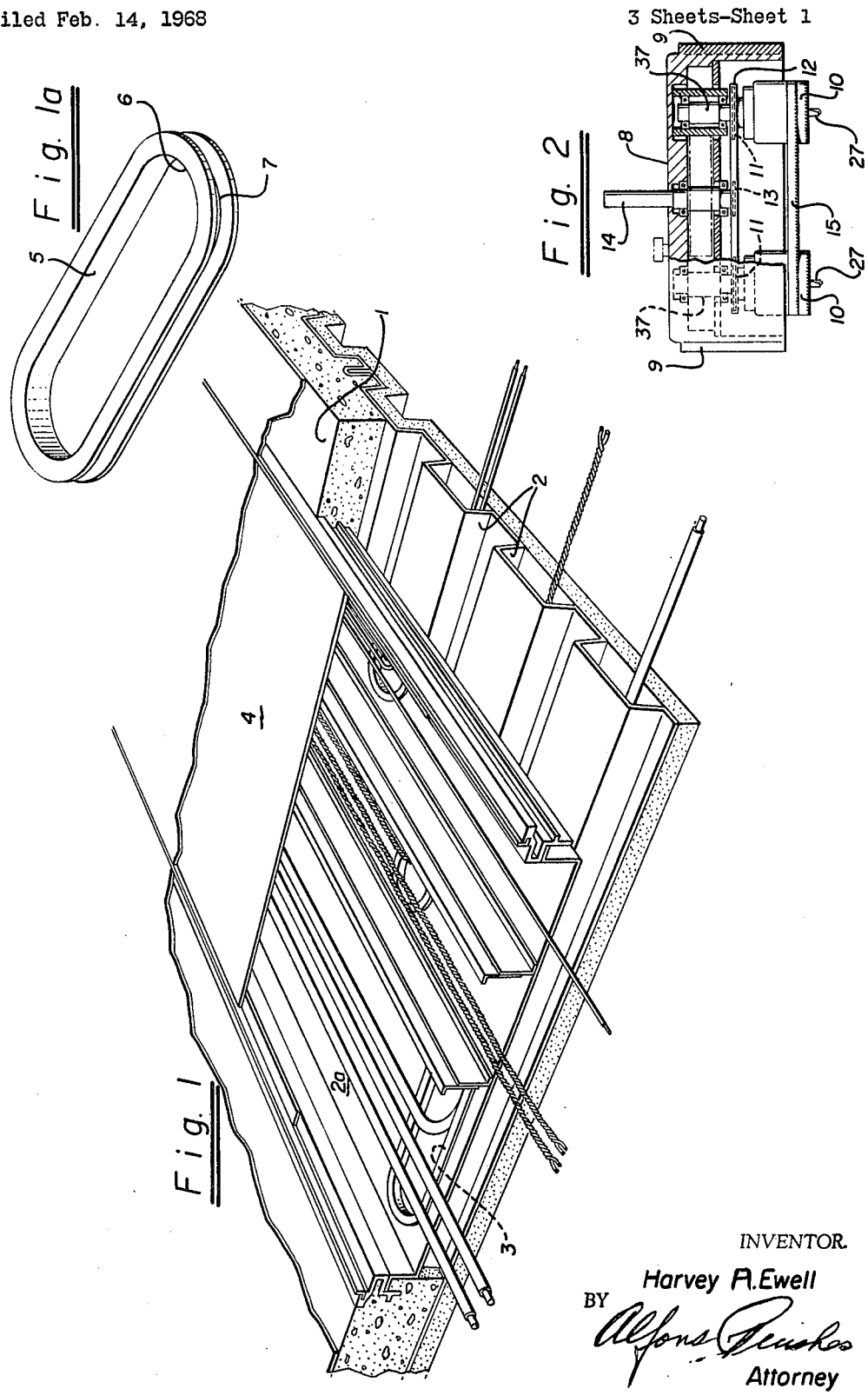

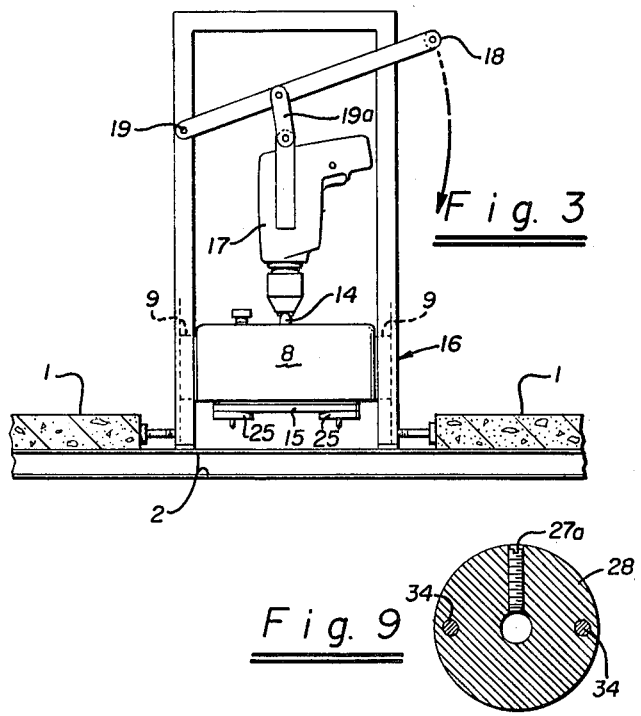
Fig. 3
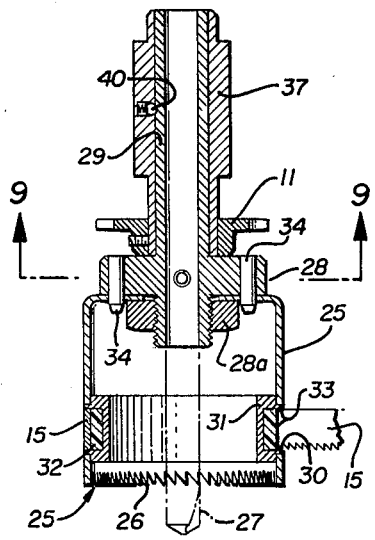
Fig. 5
Fig. 9
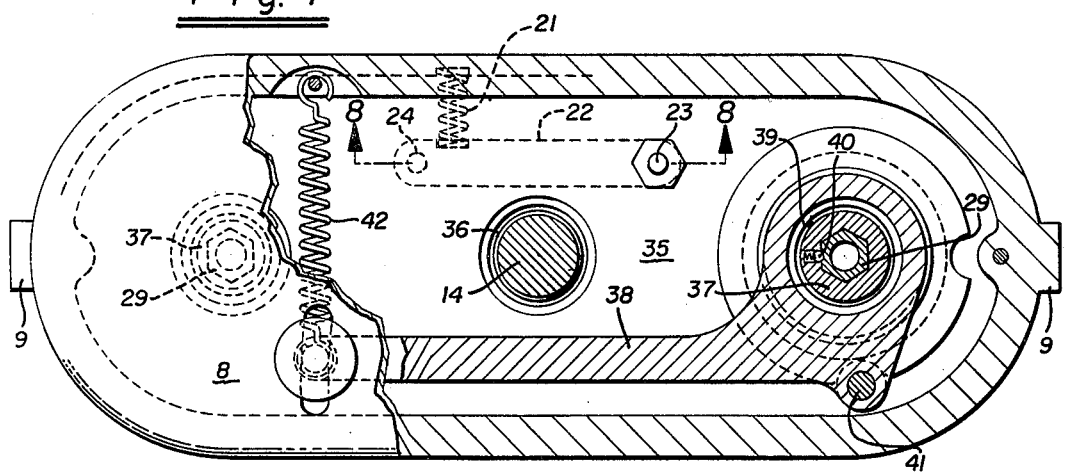
Fig. 7
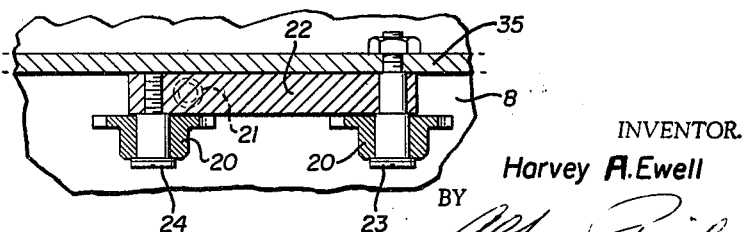
Fig. 8
INVENTOR.
Harvey A. Ewell
BY
Attorney March 10, 1970  H. A. EWELL  3,499,353
MACHINE FOR CUTTING OBROUND HOLES
Filed Feb. 14, 1968  3 Sheets-Sheet 3

United States Patent Office 3,499,353
Patented Mar. 10, 1970

3,499,353
MACHINE FOR CUTTING OBROUND HOLES
Harvey A. Ewell, Fairfax, Calif.
(15980 Mt. Rose Road, Reno, Nev. 89502)
Filed Feb. 14, 1968, Ser. No. 705,419
Int. Cl. B23b 51/08, 51/04; B26d 1/46
U.S. Cl. 77—65         7 Claims

ABSTRACT OF THE DISCLOSURE

A pair of hole saws is combined in a novel manner with a band saw and a specially constructed driving mechanism. The three saws are operated simultaneously as a unit by the mechanism and will cut a hole of generally oblong configuration, having two parallel sides and semi-circular ends in one operation, and which is known in the building industry as an "obround" hole. My invention is especially adapted for cutting holes of this shape in narrow duct work where other cutting or sawing means are difficult or impossible to use.

BACKGROUND OF THE INVENTION

In the building construction industry, for some years now, there has been applied a cellular floor construction which comprises essentially a sub-floor having a multiplicity of parallel cells or openings which communicate with headers, also of hollow construction located beneath the floor surface or slab. These are used to facilitate the installation of various utilities; power, light, telephone, and other types of wiring from a central location to distribution points around the floor of the building where desks and various types of equipment may be located. This is sometimes referred to as the "Q" type of floor construction and is described more fully below. Its advantages in providing greater flexibility and economy in supplying services to a commercial or industrial building has been known to the art for some time.

In order to provide communication between the cellular sections or raceways which carry the conductors under the floor and the headers running at right angles to them, from which the conductors are brought out to their points of use, it is necessary to make holes in the cells or raceways. Because it is often necessary to provide a great number of such conductors, these holes must have a generally oblong shape, but to facilitate the pulling of the conductors through, the ends of the oblong holes must be of semi-circular shape. Thus, what is known in the industry as an "obround" hole must be provided.

Since these cellular sections or raceways are of rather narrow depth, the problem of cutting such holes with existing tools and devices is a troublesome and expensive one. This has heretofore been performed by cutting two holes of circular shape with a conventional hole saw the desired distance apart, through the top of the cell. The latter are generally fabricated from sheet metal and may be as much as 8 gage in thickness. Since the depth of the cell is generally of the order of magnitude of 2 inches it is impossible to use a hacksaw or other conventional equipment because of the insufficient clearance available. Therefore it has been necessary to complete the obround holes by cutting the two parallel sides which join the circular ends by means of a saber saw or other slow means. The time and expense involved in this operation is well known to those skilled in the art.

I have discovered that I am able to combine a pair of hole saws, by modifying them suitably, with a band saw so that the three would operate simultaneously as a unit. I have discovered further a mechanism which would permit these saws to be driven as a unit simultaneously and to successfully cut an obround hole in such cellar sections or duct work in one simple operation and with great speed, economy, and flexibility. I have thus been able to effect great economies in the labor cost of construction of a business or commercial type building which utilizes the type of floor construction described herein.

SUMMARY

My invention consists, first of all, of two hole saws which are basically of a conventional commercial type but which have been modified considerably in accordance with my invention. At a given point above the cutting edge of the hole saws I provide a groove around their outer circumference and reinforce the interior of the saw to compensate for this cutaway portion. I line the base of this groove with a traction material or friction surface of rubber, neoprene, or other elastomeric material. As so modified the grooves in my hole saws then act as driving pulleys for a band saw which I provide of suitable length, and insert it in the grooves so that its circumferential periphery is flush with the outer surface of the hole saws. I then mount this assembly in a suitable frame and provide a chain and sprocket drive for both hole saws. I then mount this assembly on a suitable vertical structure which permits its vertical movement. On this structure I mount a source of rotating power which may be a conventional electric drill and provide for its coupling to the driving sprocket connecting with the chain joining the hole saws. I further provide a lever on this structure to permit upward and downward movement of the entire assembly and the application of sufficient pressure against it so that the saws would cut into the metal. The entire assembly I then mount over a cellular section or duct into which I want to cut my obround hole and proceed to do so in the manner which will become clear from the drawings and the description which follows.

DESCRIPTION OF THE DRAWINGS

FIG. 1 is an isometric section of the type of flooring construction to which my invention is particularly adapted.

FIG. 1a is an obround grommet used to line the inside of the obround hole after it has been cut.

FIG. 2 is a sectional schematic elevation of the general arrangement of my invention showing the relative position of the principal components.

FIG. 3 is a partial schematic elevation showing the basic components of my invention in working position.

FIG. 5 is a longitudinal section through one of the hole saws showing the details of a preferred construction and its adaption to receive the band saw.

FIG. 7 is a partial cutaway plan view showing the mounting arrangement for the spindles and the saws.

FIG. 8 is a section 8—8 of FIG. 7.

FIG. 9 is a section 9—9 of FIG. 5.

DESCRIPTION OF A PREFERRED EMBODIMENT

Figure 4:
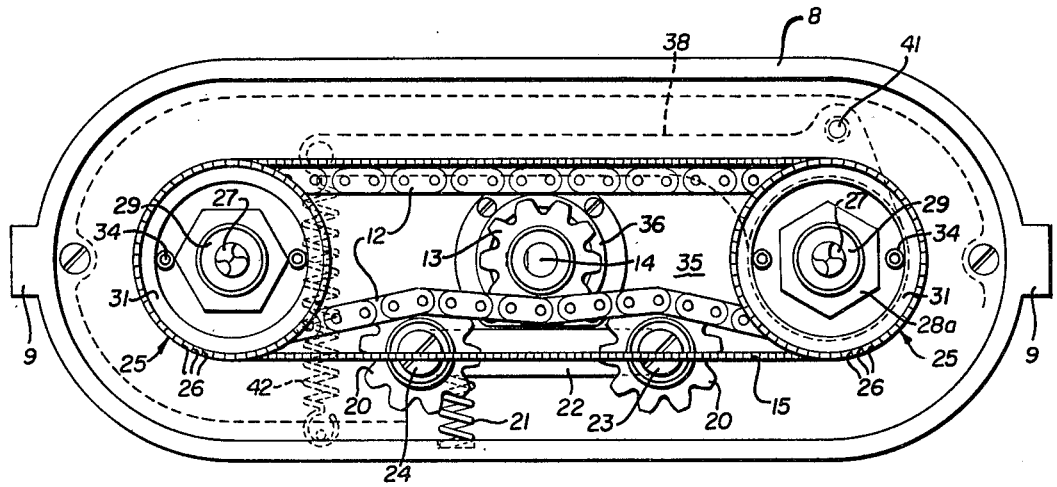
FIG. 4 is a plan view of the drive arrangement with the top plate cut away.

Referring first to FIG. 1, there is seen a conventional concrete or mastic floor deck 1, such as that encountered in buildings of the type described herein. Immediately beneath this deck are a series of parallel cellular sections of sheet metal, sometimes also called cells or raceways, which serve as conduits for the service wires and conductors in the building. These sections vary in dimension depending on structural requirements, and a typical size would be 8 gage in thickness and 2 inches in height. Trench headers or ducts 2a run at right angles to the cellular sections 2 and communicate with them at desired intervals by means of the obround holes 3. These are cut in the field as required and the manner of cutting forms the basis of my invention. Removable cover plates 4 serve to conceal these ducts and provide access when desired. In FIG. 1a which shows a grommet used to line the obround hole 3, there is seen a long or straight section of the hole 5 which may be of the order of magnitude of 7 inches in length and the semi-circular end sections 6, which may be of the order of magnitude of 3 inches in diameter. The grooved section 7 serves to hold the grommet in position around the interior edges of the hole. The grommet is customarily molded from polyethylene or similar material.

Referring now more particularly to FIG. 2 and FIG. 3, there will be seen the general arrangement of the basic components of my invention. The oblong cup shaped section 8 serves as a frame or housing for my machine. Guide shoes 9 provide the guide for the vertical movement of the machine. The hole saws 10 which are described more fully below, protrude below the bottom end of frame 8.

Figure 6:
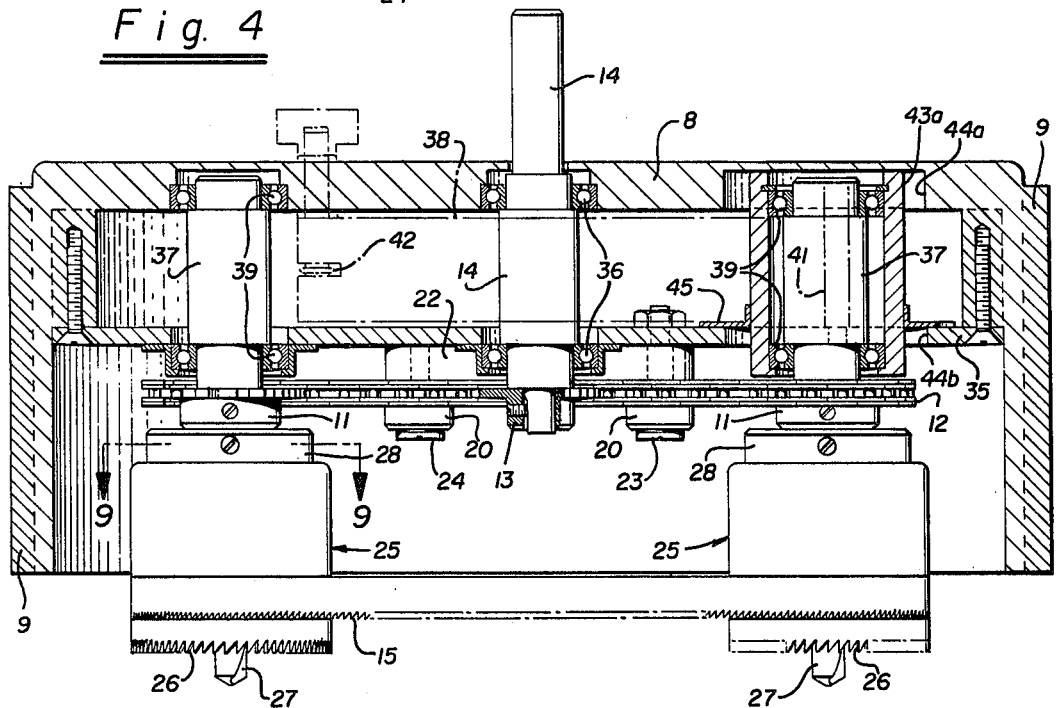
FIG. 6 is a longitudinal section showing the general mechanical arrangement of the entire machine.

Referring now also to FIGS. 4 and 6, there are seen driven sprockets 11 which are mounted on the hole saws, as described more fully below, a tandem chain drive 12 connecting both hole saws and sprockets and driving sprocket 13. Spindle 14 is adapted to connect with the main drive means which may be the chuck of an electric or air drill or similar driving device 17. The sprockets 11 and 13 may be keyed and set screwed to their respective shafts in a conventional manner. Band saw 15 is combined with hole saws 10 in the manner set forth in greater detail below.

The frame 16, seen best on FIG. 3, comprises a vertical steel structure of slotted construction for housing the driving motor 17 and the machine frame 8. It is equipped with a handle 18 which serves the double function of a lever for pressing the entire machine downwards and as a counter-torque lever. It is pivoted at point 19 which acts as a fulcrum and connects to the driving means 17 by a suitable link 19a.

Best seen now on FIG. 4, FIG. 7 and FIG. 8 are idler sprockets 20 for maintaining an automatic take-up on the chain 12. In this it is aided by the action of spring 21 and take-up arm 22. Take-up arm 22 carries stationary pivot and stud 23 and movable stud 24, each of which mounts one of the take-up sprockets 20. The force supplied by spring 21 acts against the interior of the frame 8 and tends to adjust the tightness of chain 12. This is made necessary by the need of maintaining the proper tension of the band saw as will be more evident from the description which follows.

Referring now more particularly to FIG. 5, there is seen a detail of a preferred embodiment of one of the hole saws and drive of my invention. The hole saw 10 previously mentioned comprises a shell section 25 and a toothed or cutting section 26 with a pilot bit 27. These elements are the same as those of existing commercial hole saws. The counter-sunk head set screw 27a serves to hold bit 27 onto collar 28. Collar 28 serves as a mounting collar for the hole saw shell and is equipped with retaining nut 28a on its threaded section as shown. The collar member 28 is equipped with a hexagonal shaped drive shaft or mandrel 29.

Around the lower periphery of hole saw shell 25 there is provided a groove 30. The interior of the hole saw shell 25 is reinforced at 31 to provide for the groove 30. In the bottom of groove 30 there is provided a peripheral lining or covering of neoprene or similar elastomeric material 32 which is bonded to the groove in any manner known to those skilled in the art, and provides a traction ring or pulley surface for band saw 15 which then rides in recess 33 and over the surface of ring 32. Pins 34 are press fit into collar 28 and engage the hole saw shell 25 to augment the torque action supplied by the driving mechanism.

The hexagonal mandrel 29 is held in position in rotating sleeve 37 into which it may be slid, by means of a ball detent 40. Bearings 39 and 39a, which are preferably of the anti-friction type, are positioned on the ends of sleeve 37. The bearings 39 and 39a are in turn mounted so that one end of rotating sleeve 37 is positioned in frame 8 while the opposite end of each sleeve is positioned on support plate 35 which may be bolted to frame 8, as shown especially on FIG. 6.

In order to maintain proper tension on band saw 15 and insure its proper operation, it is necessary that the center to center distance of the hole saws 25 be variable and provision made for maintaining tightness of band saw 15 on the surface of ring 32. This feature is necessary also in order that band saw 15 may be placed in position upon and removed from the driving hole saws 25 and their grooves 30 when desired.

The means which I use to accomplish the foregoing requirement is best seen on FIG. 6 and FIG. 7. I utilize a tension arm or bell crank 38 which serves to vary the position of movable bearings 39a with respect to stationary bearing 39. Tension arm 38 is pivoted at pivot 41 and is acted upon by spring 42 which is fixed at one end on frame 8. The movable bearings 39a are mounted in movable housing 43 which in turn rides in clearance space 44a in frame 8 and 44b in support plate 35. Sliding flange 45 is fixedly positioned on movable housing 43 and rides on the surface of support plate 35. It will now be evident that through the combined action of spring 42, tension arm 38, pivot 41, and the resultant sliding motion of housing 43 in spaces 44a and 44b, I am able to adjust and maintain the desired tension on band saw 15.

As the distance between the vertical center lines of the two hole saws 10 varies, the operation of drive chain 12 is properly insured by the action of idler sprockets 20, spring 21 and take-up arm 22, as previously described herein.

OPERATION

The operation of my invention in a typical case is briefly as follows. When assembled and ready for use my machine would have the general appearance shown schematically in elevation on FIG. 3. The machine is first positioned over the cellular section or raceway 2, in which the obround hole is to be cut. The frame 16 may be braced against lateral movement by means of jack screws or other suitable means, as shown also on FIG. 3. The motor is started and handle, or lever 18, is depressed until pilot bit 27 starts to cut into the upper surface of cell 2. Because of the novel construction described above, both holes saws 10 and band saw 15 revolve together as a unit. Pressure is continued until cutting edge 26 starts to cut into the upper surface of cell 2 and then is increased. This is further continued until both hole saws have cut circular holes through the material and the cutout disc falls down into the duct or cell. Further pressure on handle 18 now brings the band saw 15 into action. Again because of the novel construction described above, the outer surface of the circular section of band saw 15 will ride in the circular holes cut by the hole saws which act as a pilot for the band saw. The band saw thus continues to cut the two straight sides and completes the formation of the abround hole. The use of a band saw alone for such an operation is impracticable, since it is too flexible to withstand direct cutting into a flat surface through its projected edge and requires some stiffening or support which, in the case of my invention, is provided by the hole saws and the round holes which have previously been cut and serve to support the band saw in its travel through the material. This makes possible the use of a band saw for the cutting into a flat surface as described above.

It is well known to those skilled in the art that a good conservative recommended cutting speed in mild steel, which is the material from which the cells are usually constructed, is 100 feet per minute for band saws or hole saws having from 6 to 18 teeth per inch. For the particular construction which I disclose herein this means that a 3 inch hole saw would operate at approximately 125 revolutions per minute. The ratio between sprockets 11 and 13 is generally of the order of magnitude of from 1½ to 1 to 2 to 1. This means that the main drive spindle 14 must be rotated at a speed of approximately 200 to 250 revolutions per minute which is well within the range of commercially available electric or air drills.

While I have shown a preferred embodiment of my invention above I do not limit myself to that disclosed herein, except as I do so in the claims which follow.

I claim:
1. A machine for cutting obround holes in a material having a flat surface in one operation comprising:
   a pair of hole saws rotatably mounted vertically on a frame in spaced relation to each other with their vertical axes parallel and their cutting edges in horizontal alignment with each other;
   a band saw positioned around the periphery of said hole saws as that its cutting edge is parallel to and vertical alignment with the cutting edges of said hole saws;
   said hole saws being disposed to act as pulleys for said bandsaws;
   means for imparting simultaneously rotary motion to said hole saws;
   means for positioning said frame so that said vertical axes of said hole saws are perpendicular to said surface;
   means for forcing said frame and said saws against said surface thereby producing a cutting action of said saws on said material.

2. In a machine for cutting obround holes in a flat surface material in one operation, the improved saw combination comprising:
   a pair of hole saw members rotatably mounted vertically on a frame in spaced relation to each other, with their vertical axes parallel and their cutting edges in horizontal alignment with each other;
   a circumferential groove around the periphery and above the cutting edge of each of said hole saw members and in horizontal alignment with each other;
   a flat lining comprising a cylindrical friction surface positioned in the bottom of each of said grooves;
   a band saw member positioned in said grooves and around said hole saw members;
   said band saw member being further positioned in said grooves so that the outer surface of its circular portions are flush with the outer cylindrical surface of said hole saw members.

3. The saw of claim 2 in which said lining in said grooves comprises an elastomeric material.

4. A machine for cutting obround holes in a material having a flat surface in one operation comprising:
   a first hole saw rotatably mounted vertically in a fixed position on a frame;
   a second hole saw rotatably mounted vertically on said frame in spaced relation to said first hole saw;
      said first hole saw and said second hole saw having their vertical axes parallel and their cutting edges in horizontal alignment with each other;
   means for varying the horizontal distance between said vertical axes;
   a first sprocket fixedly mounted on said first hole saw;
   a second sprocket fixedly mounted on said second hole saw in alignment with said first sprocket;
   a chain connecting said first sprocket with said second sprocket;
   a third sprocket rotatably mounted on said frame and engaging said chain;
   means for imparting rotary motion to said third sprocket;
   a flat circumferential groove around the periphery of and in spaced relation to the cutting edge of said first hole saw;
   a flat circumferential groove around the periphery of and in spaced relation to the cutting edge of said second hole saw and in alignment with said groove in said first hole saw;
   a band saw positioned in said grooves and around said hole saws;
      the cutting edge of said band saw being parallel to, in vertical alignment with, and facing in the same direction as the cutting edges of said hole saws;
   a supporting structure disposed to receive said frame;
      said frame being positioned in vertical sliding relation on said structure;
   means for positioning said structure against said flat surface;
   a lever pivoted on said structure and disposed to engage said frame;
   whereby said frame and said saws may be forced against said surface and produce a cutting action on said material.

5. The machine of claim 4 in which the bottom of said grooves in said hole saws are lined with a material comprising a friction surface.

6. The machine of claim 5 in which said friction surface comprises an elastomeric material.

7. The machine of claim 1 including means for varying the distance between the center lines of said pair of hole saws.

References Cited

UNITED STATES PATENTS 1,137,459     1915   Campbell.

ANDREW R. JUHASZ, Primary Examiner

J. F. COAN, Assistant Examiner

U.S. Cl. X.R.

77—69; 83—201.01; 143—85